United States Patent
Egawa

(10) Patent No.: US 8,339,476 B2
(45) Date of Patent: Dec. 25, 2012

(54) IMAGE SENSING APPARATUS AND CONTROL METHOD FOR SAME, AND IMAGE SENSING SYSTEM

(75) Inventor: Akira Egawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 583 days.

(21) Appl. No.: 12/142,348

(22) Filed: Jun. 19, 2008

(65) Prior Publication Data

US 2008/0316330 A1 Dec. 25, 2008

(30) Foreign Application Priority Data

Jun. 22, 2007 (JP) ................................ 2007-165308

(51) Int. Cl.
*H04N 5/235* (2006.01)
(52) U.S. Cl. .............. 348/230.1; 348/229.1; 348/333.11
(58) Field of Classification Search ............... 348/229.1, 348/333.11, 230.1
See application file for complete search history.

(56) References Cited

U.S. PATENT DOCUMENTS

| | | | | |
|---|---|---|---|---|
| 6,963,374 B2* | 11/2005 | Nakamura et al. | ....... | 348/333.11 |
| 7,361,472 B2* | 4/2008 | Yguerabide et al. | ........... | 435/7.1 |
| 7,884,868 B2* | 2/2011 | Kurane | .......................... | 348/297 |
| 7,986,363 B2* | 7/2011 | Krymski | ....................... | 348/308 |
| 8,174,591 B2* | 5/2012 | Ojima et al. | .................... | 348/272 |
| 2002/0003581 A1* | 1/2002 | Sato et al. | ................. | 348/333.11 |
| 2005/0083419 A1* | 4/2005 | Honda et al. | .................. | 348/244 |
| 2006/0012689 A1* | 1/2006 | Dalton et al. | .............. | 348/224.1 |
| 2006/0072023 A1* | 4/2006 | Kurosawa et al. | ............ | 348/294 |
| 2006/0114340 A1* | 6/2006 | Sakurai et al. | ................ | 348/239 |
| 2007/0223904 A1* | 9/2007 | Bloom et al. | .................. | 396/100 |
| 2008/0084483 A1* | 4/2008 | Kusaka | ....................... | 348/222.1 |
| 2009/0021588 A1* | 1/2009 | Border et al. | .............. | 348/208.1 |

FOREIGN PATENT DOCUMENTS

| | | |
|---|---|---|
| JP | 2002-027326 | 1/2002 |
| JP | 2005-117396 | 4/2005 |
| JP | 2005-117494 A | 4/2005 |
| JP | 2006-166252 A | 6/2006 |

OTHER PUBLICATIONS

The above references were cited in a Oct. 28, 2011 Japanese Office Action, a copy of which is enclosed without an English Translation, that issued in Japanese Patent Application No. 2007-165308.

* cited by examiner

*Primary Examiner* — Chieh M Fan
*Assistant Examiner* — Antoinette Spinks
(74) *Attorney, Agent, or Firm* — Cowan, Liebowitz & Latman, P.C.

(57) ABSTRACT

An image sensing apparatus includes an image sensor including a plurality of pixels, a control unit that, during an exposure operation that generates an image in the image sensor, reads out signals of a first portion of pixels among an entire frame of pixels from the image sensor, outputs an image based on the signals of the first portion of pixels to a display unit, and, when the exposure operation is completed, reads out signals of the entire frame of pixels from the image sensor, and an image processing unit that generates an image by adding the signals of the first portion of pixels to signals of the entire frame of pixels for corresponding pixels.

4 Claims, 5 Drawing Sheets

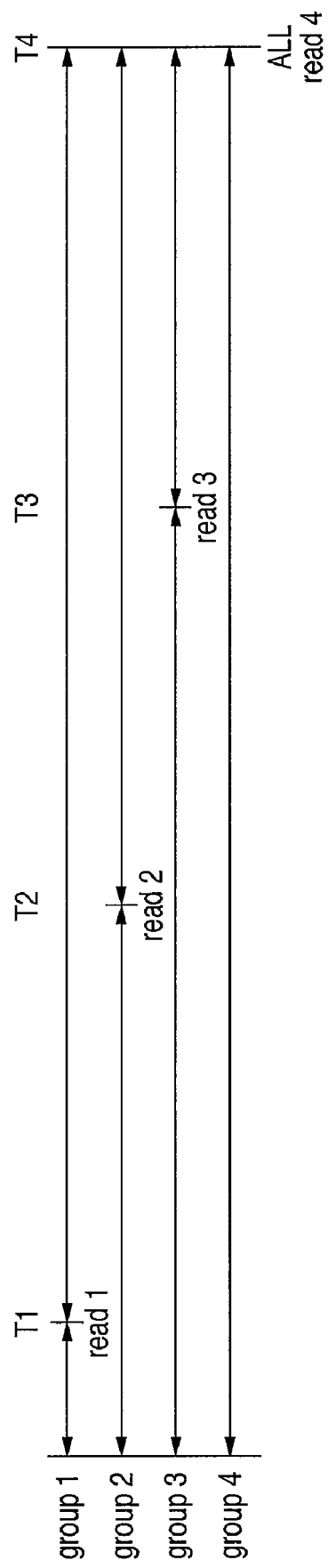

IMAGE SENSING APPARATUS AND CONTROL METHOD FOR SAME, AND IMAGE SENSING SYSTEM

BACKGROUND OF THE INVENTION

1. Field of the Invention

The present invention relates to an image sensing apparatus capable of confirming exposure state during still image photography and a control method for the image sensing apparatus, and an image sensing system.

2. Description of the Related Art

With a conventional film photograph, exposure state is not known until the film is developed. However, with a digital camera the exposure state can be confirmed then and there.

Japanese Patent Laid-Open No. 2005-117396 discloses a technology capable of confirming the exposure state during photography even at long exposure times. In this technology, certain pixels forming a portion of an image sensor are read out during the exposure period at predetermined time intervals using destructive read out and the read out pixel data is respectively added on the previously read out pixel data and the added pixel data is displayed.

Japanese Patent Laid-Open No. 2002-27326 discloses a technology capable of displaying the exposure state during main exposure by using a non-destructive read out type image sensor.

In order to observe the exposure state in still image photography at slow shutter speed, the image signals could be read out during exposure and a digitized image added digitally. However, by dividing the read-out over multiple times, fixed-pattern noise and random noise generated in the read-out circuit are amplified, degrading the quality of the still image. Moreover, there is a possibility that exposure light amount per time may be inadequate and an image not obtained because image signals are obscured by quantification error.

In addition, in the method described in Japanese Patent Laid-Open No. 2005-117396, an image for exposure state display is susceptible to the problem encountered with digital addition described above, and moreover, in exposure state display, because pixels at the same location are always used there exist pixels that are not displayed. Conversely, with respect to still images, there is the problem of drop-out of information of the image used for exposure state display.

As a method that adds analogically instead of adding digitally, non-destructive read out from the image sensor is possible. Non-destructive read out is easy with a CMOS configuration, but in order to make the CMOS configuration low-noise high performance, it is necessary to carry out the destructive read out that completely transfers the charge from photodiodes.

SUMMARY OF THE INVENTION

The present invention has been made in consideration of the above situation, and has as its object to carry out output of a signal at low noise during an exposure operation that generates an image for recording.

According to the present invention, the foregoing object is attained by providing an image sensing apparatus comprising: an image sensor including a plurality of pixels; a control unit that, during an exposure operation that generates an image in the image sensor, reads out signals of a first portion of pixels among an entire frame of pixels from the image sensor, outputs an image based on the signals of the first portion of pixels to a display unit, and, when the exposure operation is completed, reads out signals of the entire frame of pixels from the image sensor; and an image processing unit that generates an image by adding the signals of the first portion of pixels to signals of the entire frame of pixels for corresponding pixels.

According to the present invention, the foregoing object is also attained by providing An image sensing system comprising: an optical system; and the above described image sensing apparatus.

According to the present invention, the foregoing object is also attained by providing a control method for an image sensing apparatus comprising an image sensor including a plurality of pixels, the control method comprising: reading out, during an exposure operation that generates an image in the image sensor, signals of a first portion of pixels among an entire frame of pixels from the image sensor; outputting the signals of the first portion of pixels to a display unit; reading out signals for the entire frame of pixels from the image sensor when the exposure operation is completed; and generating an image by adding the signals of the first portion of pixels to signals of the entire frame of pixels for corresponding pixels.

Further features of the present invention will become apparent from the following description of exemplary embodiments (with reference to the attached drawings).

BRIEF DESCRIPTION OF THE DRAWINGS

FIGS. 2A and 2B are diagrams illustrating operation of the image sensing apparatus according to the embodiment of the present invention;

DESCRIPTION OF THE EMBODIMENTS

Preferred embodiments of the present invention will be described in detail in accordance with the accompanying drawings.

Figure 1:
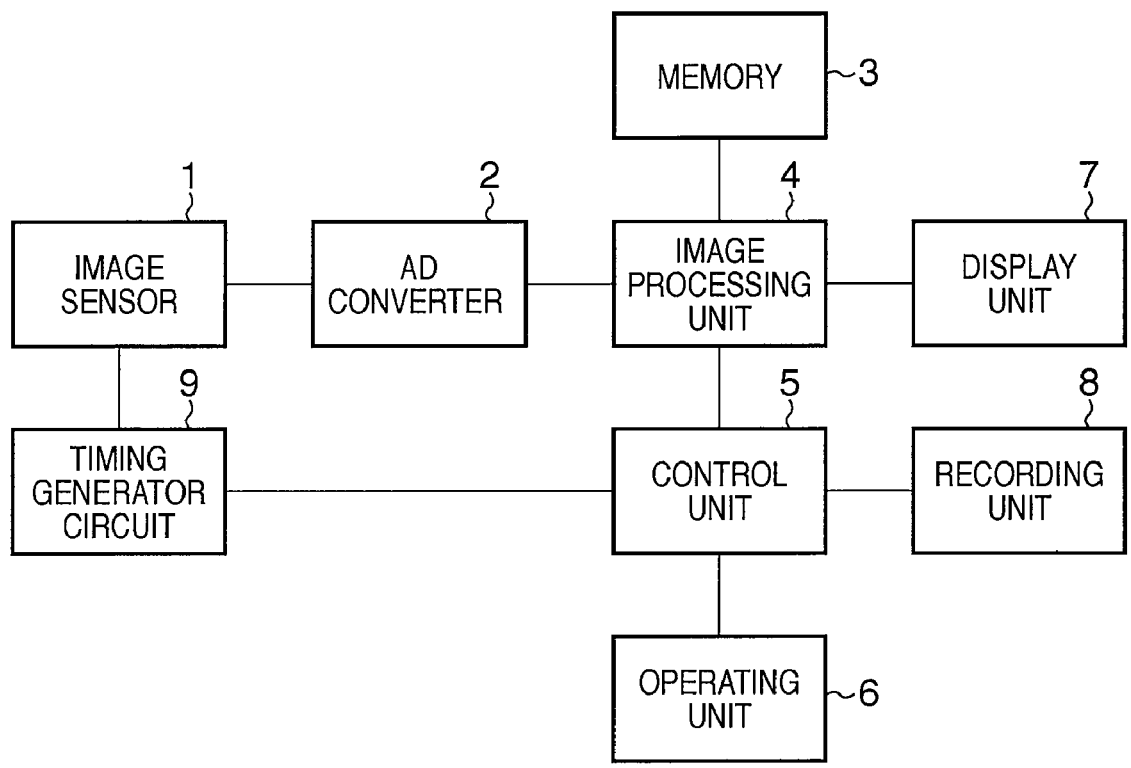
FIG. 1 is a block diagram illustrating a configuration of an image sensing apparatus according to an embodiment of the present invention.

FIG. 1 is a block diagram illustrating the configuration of an image sensing apparatus according to a preferred embodiment of the present invention.

Reference numeral 1 designates an image sensor, which carries out destructive read out. Reference numeral 2 designates an AD converter, which converts analog signals into digital signals. Reference numeral 3 designates a memory, which stores image signals. Reference numeral 4 designates an image processing unit, which synthesizes, develops, and otherwise processes the image signals stored in the memory 3. Reference numeral 5 designates a control unit, which controls the entire image sensing apparatus. Reference numeral 6 designates an operating unit, which accepts operations from a photographer. Reference numeral 7 designates a display unit, which displays images and menus. Reference numeral 8 designates a recording unit, which records photographed images. Reference numeral 9 designates a timing generator circuit, which drives the image sensor 1. In addition, an image sensing system is constructed that obtains photographed images by providing the above-described image sensing apparatus with an optical system and forming an image of a subject from the optical system on the image sensor 1.

Figure 2A:
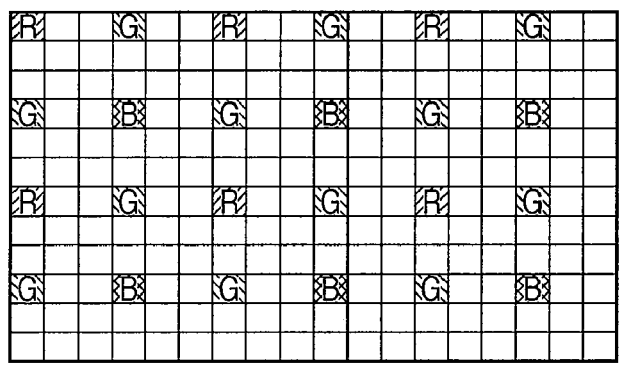
Figure 2A:
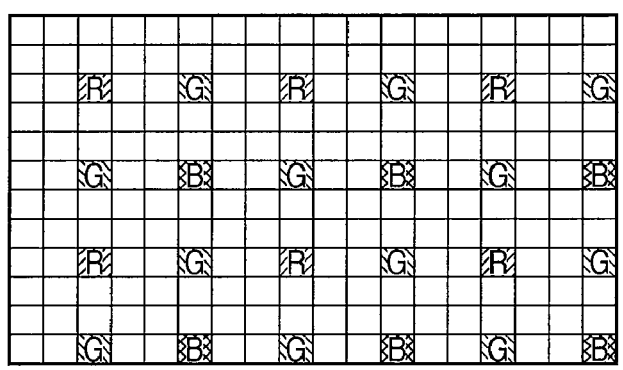
Figure 2A:
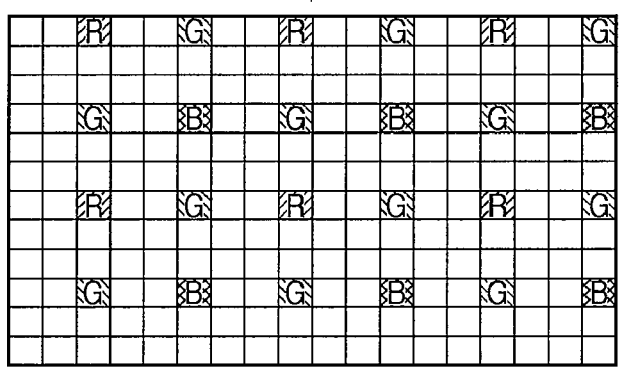
Figure 2A:
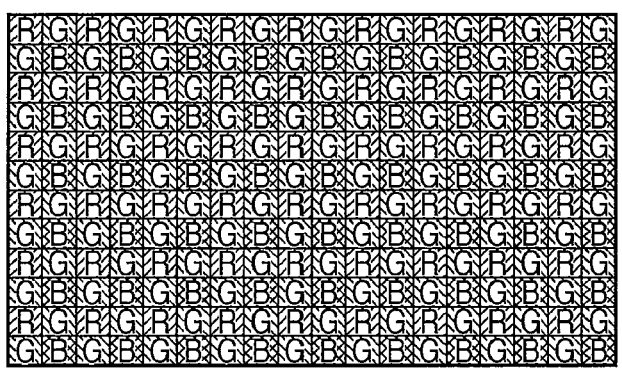

FIGS. 2A and 2B are diagrams illustrating operation of the image sensing apparatus according to the embodiment of the present invention. FIG. 2A shows pixels to be read out from the image sensor 1, and FIG. 2B shows a display image read-out timing. In FIG. 2B, the horizontal axis represents time, such that the further one goes toward the right in the diagram the more time has elapsed.

As shown in FIG. 2A, the image sensor 1 includes a plurality of pixels. These plurality of pixels are divided into a plurality of groups. The pixels are divided into groups so that, when thinning read out of the image sensor 1 is performed during an exposure operation (during main exposure) that generates an image for recording, the pixels that are read out are different at different readout timings. Here, a Bayer arrangement is assumed as a color filter arrangement for the image sensor 1. In the Bayer arrangement, the pixels of the image sensor 1 can be divided into nine groups composed of pixels thinned to ⅓ vertically and horizontally, respectively. The size of the image of each group of the nine groups is only ⅓ the size of the image of all the pixels combined, but that is enough to confirm the exposure state. Since these nine groups are composed of different pixels, combining the images of all the groups yields a full-screen image.

Next, a description is given of the operation of the image sensing apparatus, with reference to FIG. 2B. In the present embodiment, an example is used of read-out of signals from pixels of three groups group 1 through group 3 of the nine groups described above.

First, the control unit 5, at a timing T1 from the start of slow shutter speed charge accumulation during main exposure, reads out the signals of the pixels of group 1, which pixels are a first portion of the pixels of an entire frame, and displays the signals sequentially on a display unit 7. Next, the control unit 5, at a timing T2 from the start of slow shutter speed charge accumulation during main exposure, reads out the signals of the pixels of group 2, which pixels are a second portion of the pixels of an entire frame and interlaced with group 1, and outputs the signals to the display unit 7. At this point, since the signals of the pixels of group 1 have already been read out during main exposure, signals are not read out from the pixels of group 1.

Subsequently, the control unit 5, at a timing T3 from the start of slow shutter speed charge accumulation during main exposure, reads out the signals of the pixels of group 3, which pixels are a third portion of the pixels of an entire frame, and outputs the signals to the display unit 7. At this point too, since the signals of the pixels of group 1 and of group 2 have already been read out during main exposure, signals are not read out from the pixels of group 1 and group 2. Thus, as described above, of the signals of the plurality of pixels that constitute the image sensor 1, the control unit 5, during main exposure, outputs to the display unit 7, at set time intervals, the signals of those pixels that have not yet been read out during main exposure.

It should be noted that electrical charges continue to accumulate in the pixels of the image sensor 1 even during read-out of the groups 1 through 3 described above, with electrical charge accumulation of the read-out pixels recommenced immediately after read-out.

Thereafter, the control unit 5, at a time T4 that is a set charge accumulation end time or a time that the photographer, by looking at the display unit 7 and manipulating the operating unit 6, instructs as the end of charge accumulation, reads out the signals of all the pixels and outputs the signals to the memory 3. The volume of signals read out from the pixels at this time differs depending on the group. For example, the signals accumulated in the pixels of group 1 are those accumulated from T1 to T4, those of group 2 accumulated from T2 to T4, and those of group 3 from T3 to T4. The image for recording may be generated by adding the signals of the pixels of the groups 1 to 3 read out at T1, T2, and T3, respectively, and stored in the memory 3, to the signals of the corresponding pixels constituting an entire frame read out at T4 and stored in the memory 3.

Conventionally, since either certain pixels or all pixels are read out four times, the read-out noise was great. By contrast, according to the present embodiment, the pixels are read out twice at most, and the noise generated by read-out is reduced. In addition, since the number of read-outs from the pixels is small, which increases a possibility that the charge accumulation time becomes long, a possibility that sufficient light enters the pixels also increases, thus improving the S/N ratio without image signals being buried by quantification error. Moreover, even when the charge accumulation time is long, since the pixels are divided into nine groups, nine read out can be performed during the charge accumulation time by reading out the nine groups in turn at different timings.

Figure 3:
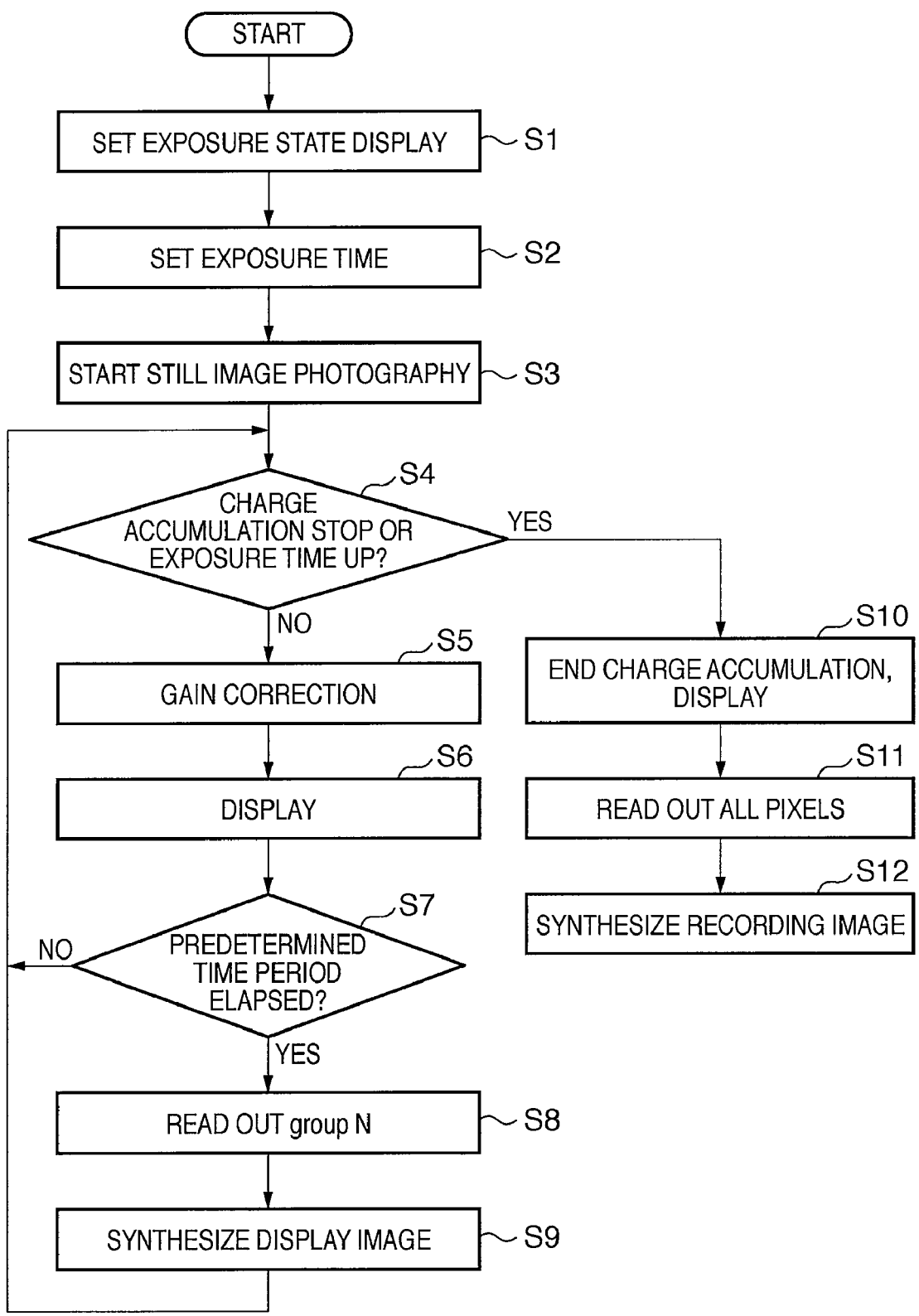
FIG. 3 is a flow chart illustrating drive control of the image sensing apparatus according to the embodiment of the present invention.

FIG. 3 is a flow chart illustrating drive control of the image sensing apparatus according to the embodiment of the present invention.

In step S1, the setting of the display of exposure state of photography at slow shutter speed exposure is set by the operating unit 6.

In step S2, the exposure time is set by the operating unit 6.

In step S3, still image photography is started by the operating unit 6 and a charge accumulation operation (an exposure operation) of the image sensor 1 is started.

In step S4, it is determined if there has been an operation by the operating unit 6 to stop charge accumulation (exposure), or if the exposure time set in step S2 has ended. If the conditions of step S4 are satisfied (YES at step S4), processing proceeds to step S10. If the conditions of step S4 are not satisfied (NO at step S4), processing proceeds to step S5.

In step S5, as will be described later with reference to FIG. 4, since the image read-out frame rate is lower than the image display frame rate, between read-out frames the brightness of the display image is gain-corrected according to the charge accumulation time. From the start of charge accumulation to the first read-out there is no image data, and therefore a fixed color display (or a freeze display of an image just prior to the start of photography) is carried out. Gain correction is carried out on the image data stored in the memory 3 by the image processing unit 4.

In step S6, the image data gain-corrected in step S5 is displayed on the display unit 7.

In step S7, it is determined whether or not a predetermined time period determined by the read-out frame rate has elapsed (that is, whether it is a read-out timing or not). In a case in which the predetermined time period has elapsed (YES at step S7), processing proceeds to step S8. If the predetermined time period has not elapsed (NO at step S7), processing returns to step S4.

In step S8, the signals of the pixels of the group (group N) selected by the timing generator circuit 9 from the image sensor 1 are output, and converted into digital signals by the AD converter 2. These digital signals are then input to the image processing unit 4 and stored in the memory 3.

In step S9, as is described later with reference to FIG. 4, the images of the groups are synthesized as a display image by the image processing unit 4. In this manner, by combining a plurality of images to display the exposure state, the loss of image information even in exposure state display can be reduced.

In step S10, the charge accumulation operation (exposure operation) in the image sensor 1 is ended, and exposure state display is also ended.

In step S11, all the pixels are read out.

In step S12, as shown in FIG. 2A and FIG. 2B, the images stored in the memory are synthesized by adding signals of the images for corresponding pixels to generate a full-size still image.

It should be noted that although in the present embodiment the pixels are thinned to ⅓ both in the vertical direction and in the horizontal direction and read out, alternatively they need only be thinned in either the vertical direction or in the horizontal direction. In addition, the pixels that are thinned and read out in these directions are not limited to ⅓, and may be changed as convenient. Moreover, the number of groups read out during main exposure is not limited to three, and may be changed as convenient. Additionally, although an example is given here of a case in which the pixels (RGB) of a Bayer arrangement are thinned at an equal pitch and read out, alternatively the pixels (RGB) of the Bayer arrangement may be constituted as the basic unit and grouped accordingly.

Figure 4:
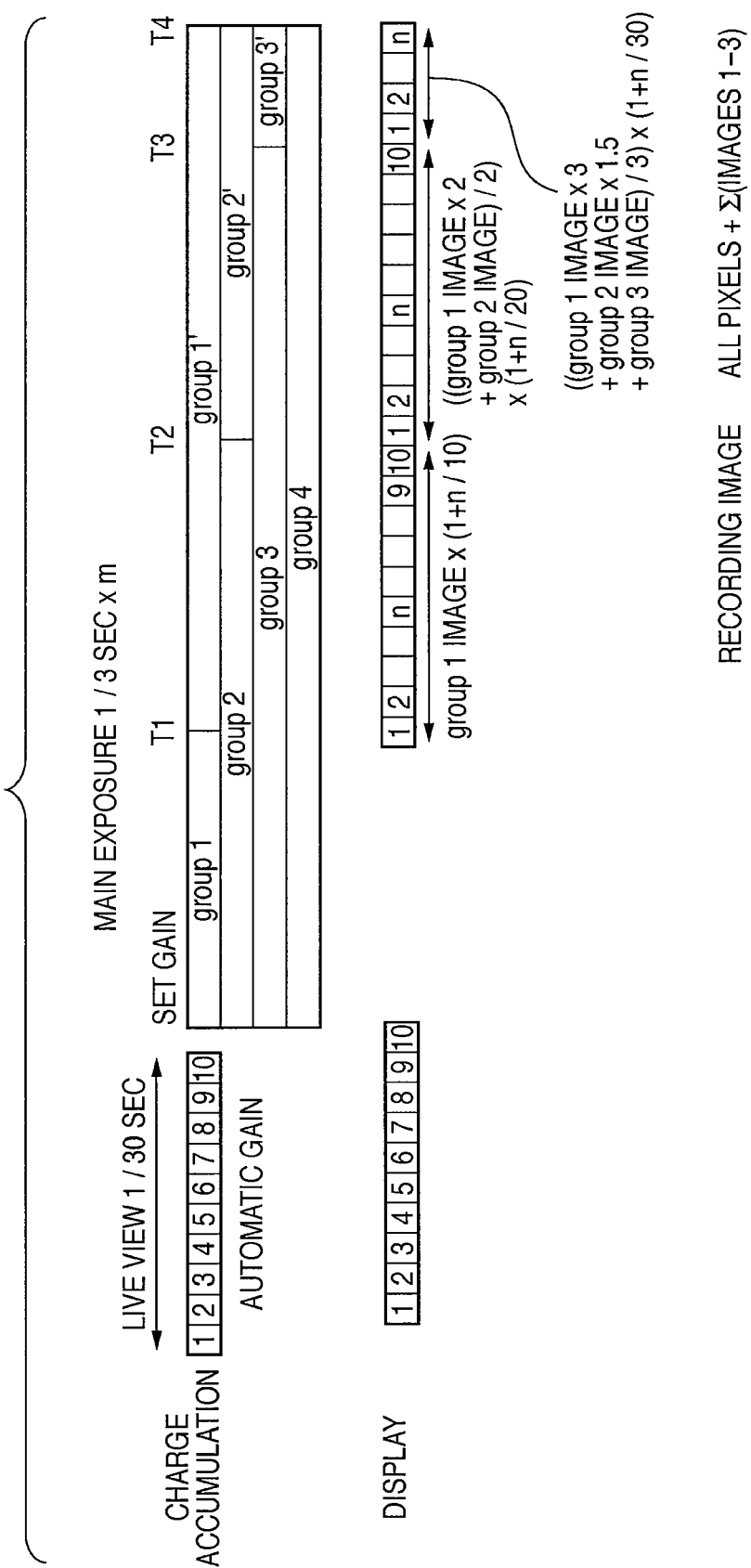
FIG. 4 is a diagram showing drive control of the image sensing apparatus according to the embodiment of the present invention.

A description is now given of the process of synthesizing the partial images read out as shown in FIG. 2A and FIG. 2B into a display image that is carried out in step S9, with reference to FIG. 4.

Assume that frames are displayed on the display unit 7 during live view display prior to slow shutter speed exposure at a frame rate of 30 frames/second, and that the read-out frame rate during main exposure is 3 frames/sec. It should be noted that the frame rate may be varied depending on the exposure time. Thus, for example, the frame rate may be 1 frame/sec, or 0.5 frame/sec.

The start of main exposure and the ability to display the exposure state comes after read-out of the pixels of group 1 at T1. Although the image of group 1 may be output as is up to T2, ⅓ of a second after T1, at which time the pixels of group 2 are read out, in the present embodiment the gain is changed so that the image is lightened in stages depending on the elapsed time since the start of main exposure. During T1-T2, an image that is 1/10 the image of group 1 read out at T1 is added every 1/30 of a second to the image of group 1. Therefore, the image that is displayed in the interval from T1 to T2 is the image of group 1 (group 1 image)×(1+n/10). After the image of group 2 is read out at T2, what is displayed is ((group 1 image×2+group 2 image)/2)×(1+n/20). After the image of group 3 is read out at T3, what is displayed is ((group 1 image×3+group 2 image×1.5+group 3 image)/3)×(1+n/30). Thus, from T2 onward, the read-out group image signals are averaged and used for display. It should be noted that n, as shown in FIG. 4, is an integer that increases sequentially starting from 1 each time the image is displayed in each interval. Thus, changing the gain and displaying the gain-corrected image makes it possible to confirm the exposure state (the brightness of the image) from the start of main exposure to image display.

It should be noted that although the images of the groups are composed of signals from pixels that differ by group, the relationship between the positions of the pixels of the images in a frame need to be taken into account when recording, and in the displayed image signals read out in the same order are treated as signals of the same pixels as shown in the "display" in FIG. 2A. In addition, since too much gain to the image of the group in the first half of exposure produces noticeable noise, in the latter half of exposure, when computing the display image this first-half group image may be excluded from averaging. In other words, display may be carried out using only the image signals of the latest read-out group. Moreover, in a case in which a slow shutter speed exposure time has been set, the charge accumulation time of each group may be determined by the number of groups into which the pixels are divided and a single pixel read out twice. For example, in the case of the grouping shown in FIG. 2A, after reading group 1→group 2→group 3, group 1→group 2→group 3 may be read again, in order, and further, group 4 may be read. Furthermore, in a case in which the photographer checks the exposure state display image and determines to end charge accumulation, where the exposure time is long the same group may be read out three times or more. In this case also, the display image can be similarly gain-corrected, and the recording image synthesized from all the read-out images.

Thus, as described above, by gain-correcting and displaying a plurality of images used for exposure state display according to the elapsed time from still image photography, the exposure state can be confirmed even when the read-out time interval for the plurality of images used for exposure state display is long. In addition, by lengthening the read-out time interval for the plurality of images used for exposure state display, the number of times the images are read out can be reduced and noise further reduced.

In the above-described embodiment a description is given of a case in which images of group 1, group 2, and group 3 read out during main exposure are gain-corrected and output so as to match the frame rate. However, the present invention is not limited thereto, and alternatively the images of group 1, group 2, and group 3 read out during main exposure may be displayed respectively as is. In that case, although time resolution declines the exposure state can still be confirmed, and at the same time noise during read-out can be reduced below that of conventional methods because signals of different pixels are read out.

In the above-described embodiment, a description is given that involves a group 1, a group 2, and a group 3. However, although the accuracy of the exposure state display will decline, group 1 alone is sufficient.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structure and functions.

This application claims the benefit of Japanese Patent Application No. 2007-165308, filed on Jun. 22, 2007, which is hereby incorporated by reference herein in its entirety.

What is claimed is:

1. An image sensing apparatus comprising:
an image sensor including a plurality of pixels;
a control unit that, during an exposure operation that generates an image in the image sensor, reads out signals of a first portion of pixels among an entire frame of pixels from the image sensor by destructive read out, outputs an image based on the signals of the first portion of pixels to a display unit,
after reading out signals of the first portion of pixels by destructive read out, reads out by destructive read out signals of a second portion of pixels different from the first portion of pixels, and outputs an image based on at least the read-out signals of the second portion of pixels to the display unit,
after reading out signals of the second portion of pixels by destructive read out, reads out by destructive read out signals of a third portion of pixels different from the first and second portions of pixels, and outputs an image based on at least the read-out signals of the third portion of pixels to the display unit, and, when the exposure operation is completed, reads out signals of the entire frame of pixels including the first, second and third portions of pixels from the image sensor by destructive read out; and an image processing unit that generates an image by adding the signals of the first, second and third portions of pixels to signals of the entire frame of pixels for corresponding pixels.

2. The image sensing apparatus according to claim 1, wherein the control unit respectively controls a gain of the signals of the first portion of pixels, a gain of the signals of the second portion of pixels and a gain of the signals of the third portion of pixels, the respective signals being output to the display unit according to an elapsed time since a start of the exposure operation.

3. An image sensing system comprising:

an optical system; and the image sensing apparatus according to claim 1.

4. A control method for an image sensing apparatus comprising an image sensor including a plurality of pixels, the control method comprising:

reading out, during an exposure operation that generates an image in the image sensor, signals of a first portion of pixels among an entire frame of pixels from the image sensor by destructive read out;

outputting the signals of the first portion of pixels to the display unit;

reading out, after reading out signals of the first portion of pixels by destructive read out and during an exposure operation that generates an image in the image sensor, signals of a second portion of pixels different from the first portion of pixels, among an entire frame of pixels from the image sensor by destructive read out;

outputting the signals of the second portion of pixels to the display unit;

reading out, after reading out signals of the second portion of pixels by destructive read out and during an exposure operation that generates an image in the image sensor, signals of a third portion of pixels different from the first and second portions of pixels, among an entire frame of pixels from the image sensor by destructive read out;

outputting the signals of the third portion of pixels to a display unit;

reading out signals for the entire frame of pixels including the first, second and third portions of pixels from the image sensor by destructive read out when the exposure operation is completed; and generating an image by adding the signals of the first, second and third portions portion of pixels to signals of the entire frame of pixels for corresponding pixels.

* * * * *